May 2, 1944.  E. E. HUISH  2,347,950
CHART FOR TEACHING PIANO
Filed Aug. 7, 1941  3 Sheets-Sheet 1
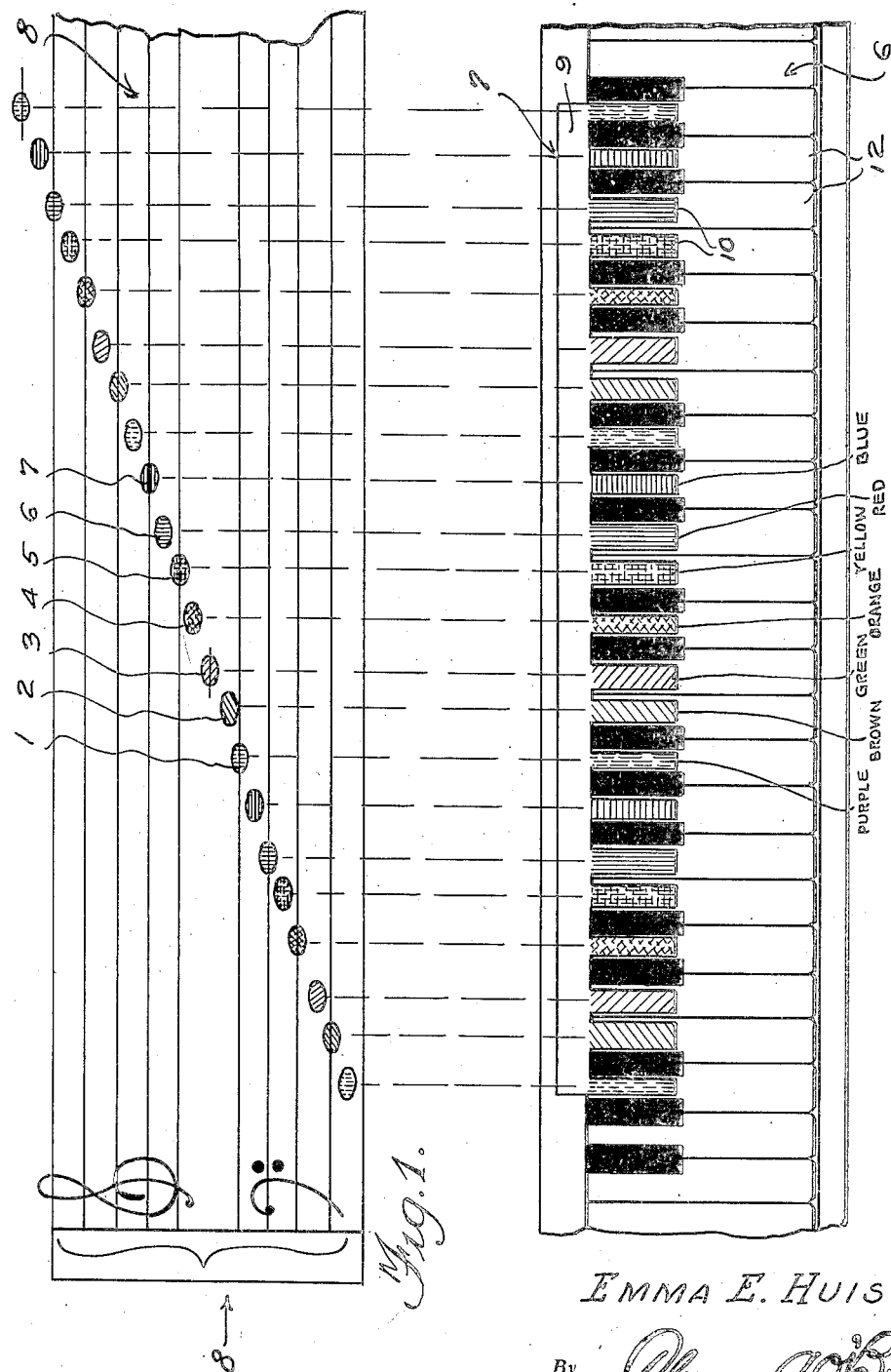
Inventor
EMMA E. HUISH,
By [signature]
Attorney May 2, 1944.    E. E. HUISH    2,347,950
CHART FOR TEACHING PIANO
Filed Aug. 7, 1941    3 Sheets-Sheet 2
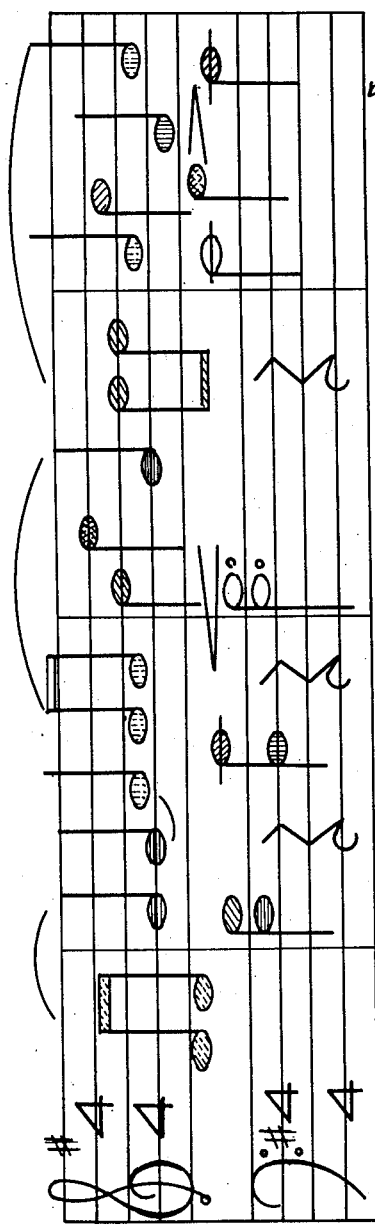
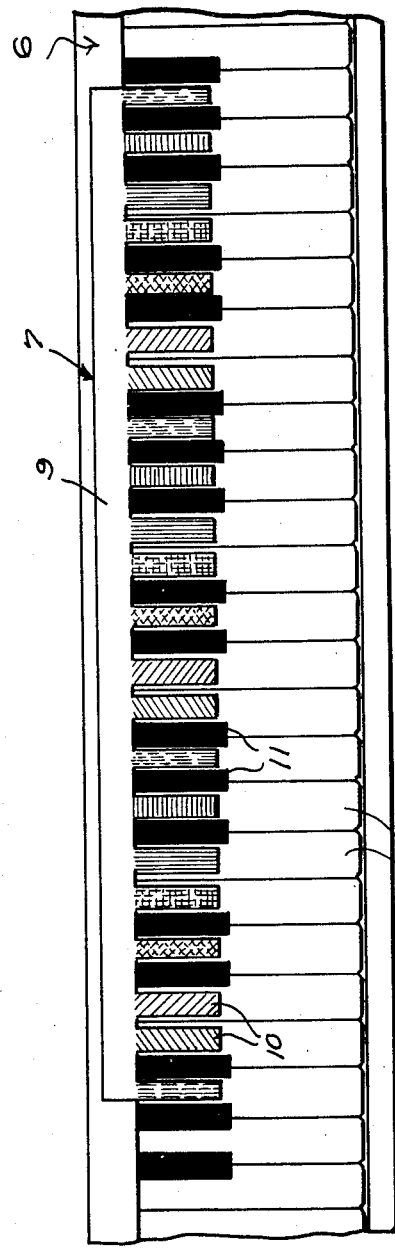
Inventor
EMMA E. HUISH,
By *Clarence A. O'Brien*
Attorney May 2, 1944.　　　　E. E. HUISH　　　　2,347,950
CHART FOR TEACHING PIANO
Filed Aug. 7, 1941　　　3 Sheets-Sheet 3
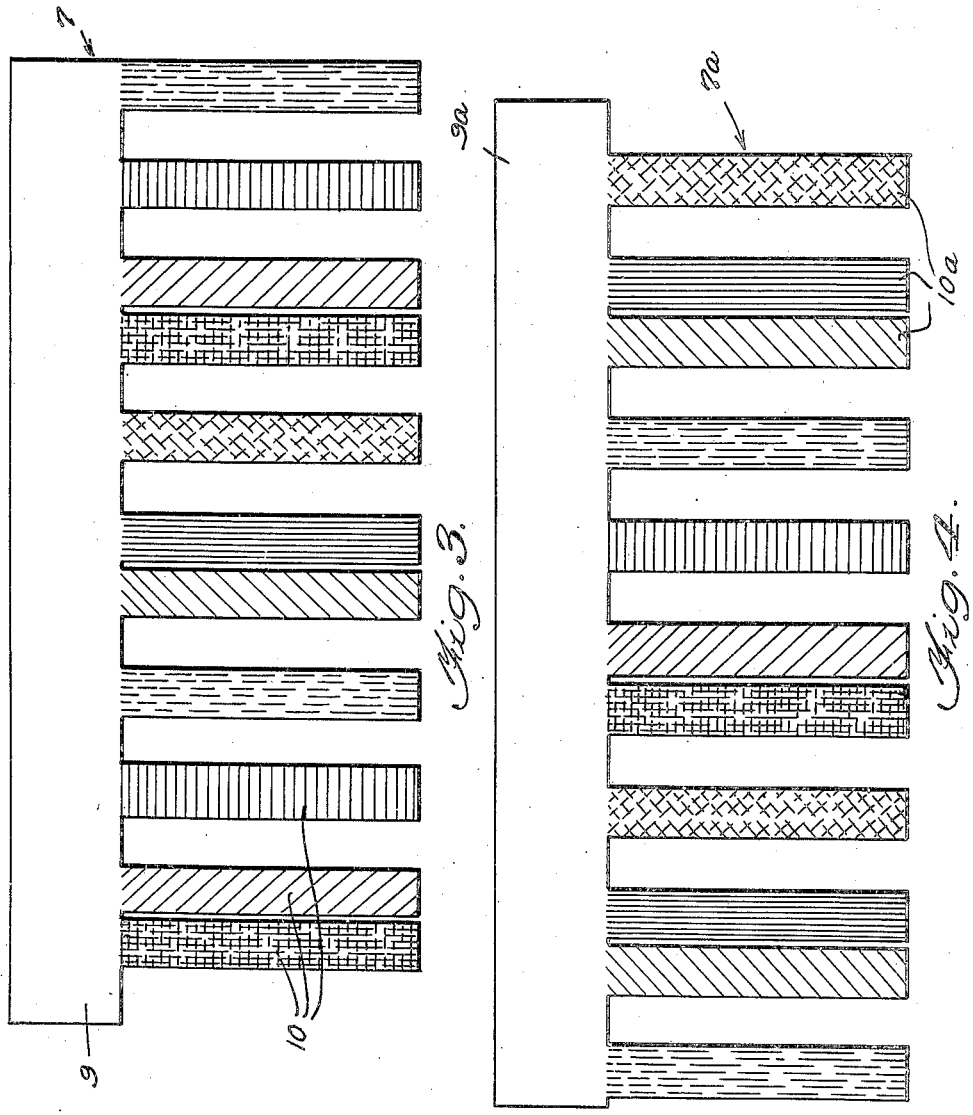
Inventor
EMMA E. HUISH,
By
Attorney Patented May 2, 1944

2,347,950

UNITED STATES PATENT OFFICE 2,347,950

CHART FOR TEACHING PIANO

Emma E. Huish, Alton, Ill.

Application August 7, 1941, Serial No. 405,850

1 Claim. (Cl. 84—478)

My invention relates to improvements in method and means employed in teaching playing of the piano and similar keyboard equipped instruments, and the primary object of my invention is to enable persons without previous musical knowledge to immediately read music and play the music on the keyboard, through providing an easily and universally recognized visual relationship between the notes and signs of the music and the keys on the keyboard.

Other important objects and advantages of my invention will be apparent from a reading of the following description and the appended drawings, wherein for purposes of illustration I have set forth preferred embodiments of my invention.

In the drawings:

Figure 1 is a schematic plan of a portion of a keyboard and Figure 1a is a view showing a piece of music in accordance with the present invention comprising the treble and base staffs with note characters on consecutive lines and also spaces thereof, from the A space in the base staff to the A line above the treble staff, the note characters in each octave being consecutively and differently colored; and showing a chart in accordance with the present invention laid on the keyboard of the piano and having piano key designating fingers corresponding in color to the corresponding note characters on the music, and with phantom lines indicating the correspondence of the note characters with the chart elements and the related keys.

Figures 2 and 2a are views similar to Figures 1 and 1a, except that the music is characterized by a different arrangement of similarly colored note characters such as would occur in an ordinary piece of music together with phrasing, base and treble clefs, rests, and bars written or printed in the color of the presiding key.

Figure 3 is an enlarged plan view of the first section of chart in accordance with the invention.

Figure 4 is a similar view of the second section to be placed at the end of the first section.

Figure 5 is an end or edge elevational view of one of the chart sections.

Referring in detail to the drawings, the numeral 6 generally designates the keyboard of a piano or other musical instrument, and the numeral 7 generally designates the chart of the present invention laid in operative position on the keyboard, with the music sheet or chart 8 positioned behind and/or above the keyboard.

The chart 7 comprises a single piece of two or more sections 7 and 7a, each comprising a cardboard or other suitable material plate or flat sheet consisting or a relatively narrow longitudinal web 9 to lie on the keyboard back of the keys, from which web project the fingers 10, which as clearly shown in Figures 3 and 4 of the drawings are elongated rectangular in shape and project at right angles from the web.

The fingers 10 are of substantially the same width and length, being only wide enough to substantially occupy the space between the black keys of the keyboard without touching them and interfering with their action. The fingers 10 are only long enough to reach to a point just short of the front ends of the black keys 11 of the instrument board while resting upon the white keys 12, of the keyboard.

The charts 7 and 7a, Figures 3 and 4, subtend preferably two or more octaves and the fingers are spaced along the web 9 at distances which will place them properly in the single and double spaces between the black keys 11. In Figure 4 the corresponding references are 7a, 9a, and 11a.

The fingers 10 of the chart comprise groups of seven consecutive fingers and these fingers are differently colored in succession from left to right, being in this instance colored purple, brown, green, orange, yellow, red, and blue, respectively, corresponding to the natural order of colors, thereby assuring that the colors and the musical notes and characters associated therewith are easily recognized, read, and remembered by young and old alike.

To each group of fingers on the chart are related similarly colored notes 1, 2, 3, 4, 5, 6 and 7, read from left to right, the said notes being aligned as indicated by the phantom lines in Figure 1 of the drawings, when the chart and the music are properly positioned, so that the pupil has no difficulty in at once recognizing the relation of the notes to the white keys 12 of the keyboard due to their correspondence in color.

As indicated in Figures 2 and 2a of the drawings, music in accordance with the present invention is characterized by capability of alignment of the notes with the fingers of the chart to which they correspond in color, the musical signs being executed in the color of the presiding key, so that the key, the notes, rests, etc., may be readily recognized and performed on the keyboard of the instrument in conjunction with the charts 7 and 7a without hesitation by an unskilled performer after short practice.

Although I have described and set forth herein preferred embodiments of my invention, it is to be definitely understood that I do not limit the application of my invention thereto, except as required by the scope of the subjoined claim.

Having described the invention, what is claimed as new is:

Apparatus for learning and/or teaching the playing by note of an instrument of the type having a keyboard comprising the conventional black and white keys arranged in successive groups of consecutive keys the black keys projecting above the plane of the other keys, said apparatus comprising a flat plate consisting of an elongated relatively narrow web portion to rest upon the keyboard behind the black keys, and of a plurality of rectangular fingers projecting forwardly from said web portion and in the plane thereof into the spaces between the black keys and adapted to lie upon the underlying white keys, said fingers being characterized by color designating means imparting pre-arranged distinguishing and identifying colors to the white keys, so as to enable their visual correlation with similarly colored notes on a separate sheet of music supported above the keyboard facing the players.

EMMA E. HUISH.